(12) United States Patent
Isobe (10) Patent No.: US 11,486,450 B2
(45) Date of Patent: Nov. 1, 2022

(54) SHAFT COUPLING (71) Applicant: NABEYA BI-TECH KABUSHIKI KAISHA, Seki (JP)

(72) Inventor: Akira Isobe, Seki (JP)

(73) Assignee: NABEYA BI-TECH KABUSHIKI KAISHA, Seki (JP)

( * ) Notice: Subject to any disclaimer, the term of this patent is extended or adjusted under 35 U.S.C. 154(b) by 713 days.

(21) Appl. No.: 16/479,439

(22) PCT Filed: Jan. 27, 2017

(86) PCT No.: PCT/JP2017/002871
§ 371 (c)(1),
(2) Date: Jul. 19, 2019

(87) PCT Pub. No.: WO2018/138856
PCT Pub. Date: Aug. 2, 2018

(65) Prior Publication Data
US 2019/0345986 A1 Nov. 14, 2019

(51) Int. Cl.
*F16D 3/79* (2006.01)
*F16F 15/14* (2006.01)

(52) U.S. Cl.
CPC ............ *F16D 3/79* (2013.01); *F16F 15/1442* (2013.01); *F16D 2200/003* (2013.01); *F16D 2200/0008* (2013.01); *F16D 2200/0021* (2013.01); *F16D 2200/0056* (2013.01); *F16D 2300/22* (2013.01); *F16F 2224/025* (2013.01); *F16F 2224/0208* (2013.01)

(58) Field of Classification Search
CPC ................... F16D 3/79; F16D 2300/22; F16D 2200/0021; F16D 2200/003; F16D 2200/0008; F16D 2200/0056; F16F 15/1442; F16F 2224/025; F16F 2224/0208
See application file for complete search history.

(56) References Cited

U.S. PATENT DOCUMENTS 3,654,775 A * 4/1972 Williams .................. F16D 3/79
464/99
4,516,955 A 5/1985 Worner et al.
5,050,446 A * 9/1991 Takashima ............ F16F 15/124
464/180

FOREIGN PATENT DOCUMENTS

CN 102792055 A 11/2012
CN 202560871 U 11/2012
(Continued)

OTHER PUBLICATIONS

Extended European Search Report dated Aug. 11, 2020 in European Patent Application No. 17894475.7, filed Jan. 27, 2017, 7 pages.

(Continued)

*Primary Examiner* — Vishal R Sahni
(74) *Attorney, Agent, or Firm* — Kilpatrick Townsend & Stockton LLP (57) ABSTRACT

A shaft coupling includes a drive hub that is coupled to a drive shaft to rotate integrally with the drive shaft, a driven hub that is coupled to a driven shaft to rotate integrally with the driven shaft, and a rotation transmission portion that transmits rotation between the drive hub and the driven hub. A dynamic vibration absorber is integrally coupled to a section of at least one of the drive hub and the driven hub. The section is an uninvolved section that is not involved in a torsional stiffness of the whole shaft coupling.

4 Claims, 11 Drawing Sheets

(56) References Cited

FOREIGN PATENT DOCUMENTS

| | | |
|---|---|---|
| DE | 3152856 A1 | 8/1983 |
| GB | 1597184 A | 9/1981 |
| JP | S61-009156 A | 1/1986 |
| JP | 3093023 | 4/2003 |
| JP | 2006348992 A | 12/2006 |
| JP | 2010203469 A | 9/2010 |
| JP | 2016153285 A | 8/2016 |
| KR | 100653608 B1 * | 12/2006 |

OTHER PUBLICATIONS

Office Action for CN 201780079698 dated Sep. 29, 2021, 6 pages.
First Office Action for CN 201780079698.2 dated Feb. 4, 2021, all pages.
International Search Report for PCT/JP2017/002871 dated Apr. 25, 2017, all pages.

* cited by examiner

SHAFT COUPLING

TECHNICAL FIELD

The present invention relates to a shaft coupling.

BACKGROUND ART

Conventionally, as disclosed in Patent Document 1 and Patent Document 2, a shaft coupling arranged between a drive shaft and a driven shaft includes a drive hub, which is coupled to the drive shaft, a driven hub, which is coupled to the driven shaft, and a rotation transmission portion, which transmits rotation between the hubs.

In Patent Document 1 and Patent Document 2, to enhance the vibration absorption performance, leaf springs and elastic members are arranged between the drive hub and the driven hub.

PRIOR ART DOCUMENTS

Patent Documents

Patent Document 1: Japanese Laid-Open Patent Publication No. 2006-348992
Patent Document 2: Japanese Laid-Open Patent Publication No. 2010-203469

SUMMARY OF THE INVENTION

Problems that the Invention is to Solve

Unfortunately, when means for improving the vibration absorption is additionally arranged between the drive hub and the driven hub, the torsional stiffness of the shaft coupling is decreased.

Accordingly, it is an objective of the present invention to provide a shaft coupling with improved vibration absorption performance while maintaining the torsional stiffness.

Means for Solving the Problems

To achieve the foregoing objective and in accordance with one aspect of the present invention, a shaft coupling is provided that includes a drive hub that is coupled to a drive shaft to rotate integrally with the drive shaft, a driven hub that is coupled to a driven shaft to rotate integrally with the driven shaft, a rotation transmission portion that transmits rotation between the drive hub and the driven hub, and a dynamic vibration absorber integrally coupled to a section of at least one of the drive hub and the driven hub. The section is an uninvolved section that is not involved in a torsional stiffness of the whole shaft coupling.

With this configuration, the dynamic vibration absorber is mounted on the uninvolved section, which is not involved in the torsional stiffness of the whole shaft coupling, so that the vibration absorption performance is enhanced while maintaining the torsional stiffness.

The dynamic vibration absorber preferably includes an inertial body, a mounting member that mounts the inertial body on the uninvolved section, and at least one elastic member that is arranged between the inertial body and the mounting member to support the inertial body. The inertial body, the mounting member, and the elastic member are arranged in a non-contact manner with respect to the drive shaft and the driven shaft.

With this configuration, the damping performance and the vibration absorption performance of the dynamic vibration absorber are reliably exerted.

The at least one of the drive hub and the driven hub is preferably shaped like a column and includes a shaft hole in which the drive shaft or the driven shaft is fitted and a pair of end faces in the axial direction. The uninvolved section is preferably one of the end faces.

With this configuration, the dynamic vibration absorber is mounted on the end face of the columnar hub, so that the vibration absorption performance is enhanced while maintaining the torsional stiffness.

The inertial body preferably includes a cover that covers an outer circumferential surface of the hub on which the mounting member is mounted, and a supported portion that is a section supported by the elastic member and is integrally coupled to the cover.

With this configuration, if the inertial body, which is arranged to cover the outer circumferential surface of the hub, has the same vibration absorption performance as, for example, a disk-shaped inertial body, the outer diameter from the rotational axis is reduced as compared to the disk-shaped inertial body, and the outer shape of the inertial body is reduced in size.

The inertial body preferably bulges in a radial direction from an outer shape of the hub to be shaped like a disk.

With this configuration, the vibration absorption performance is improved while maintaining the torsional stiffness with a simple structure.

The elastic member is preferably a single member. The elastic member and the mounting member are preferably shaped like a circular ring and each include an insertion hole in which the drive shaft or the driven shaft is inserted in a non-contact manner. The elastic member is preferably overlapped with the section of the inertial body supported by the elastic member and with the mounting member.

With this configuration, the elastic member shaped like a circular ring is overlapped with the mounting member that is also shaped like a circular ring and the inertial body, and the drive shaft and the driven shaft are inserted in the insertion holes in a non-contact manner. Thus, the damping performance and the vibration absorption performance of the dynamic vibration absorber are exerted with a simple structure.

The dynamic vibration absorber is preferably mounted on only the drive hub.

With this configuration, since the drive hub is close to the vibration source and vibrates more than the driven shaft, the efficiency in inhibiting the vibration is increased.

The dynamic vibration absorber is preferably mounted on each of the drive hub and the driven hub.

With this configuration, as compared with a case in which the dynamic vibration absorber is mounted on one hub, the configuration bears variations in the parameters such as acceleration and deceleration. That is, the configuration has high robustness. Furthermore, as compared with a case in which the dynamic vibration absorber is mounted on one hub, under the same moment of inertia ratio, the configuration improves the response to changes in the driving side, for example, the response to motor commands if the drive shaft is the output shaft of a motor.

MODES FOR CARRYING OUT THE INVENTION

First Embodiment

A shaft coupling according to a first embodiment of the present invention will be described with reference to FIGS. 1 to 4.

Figure 1:
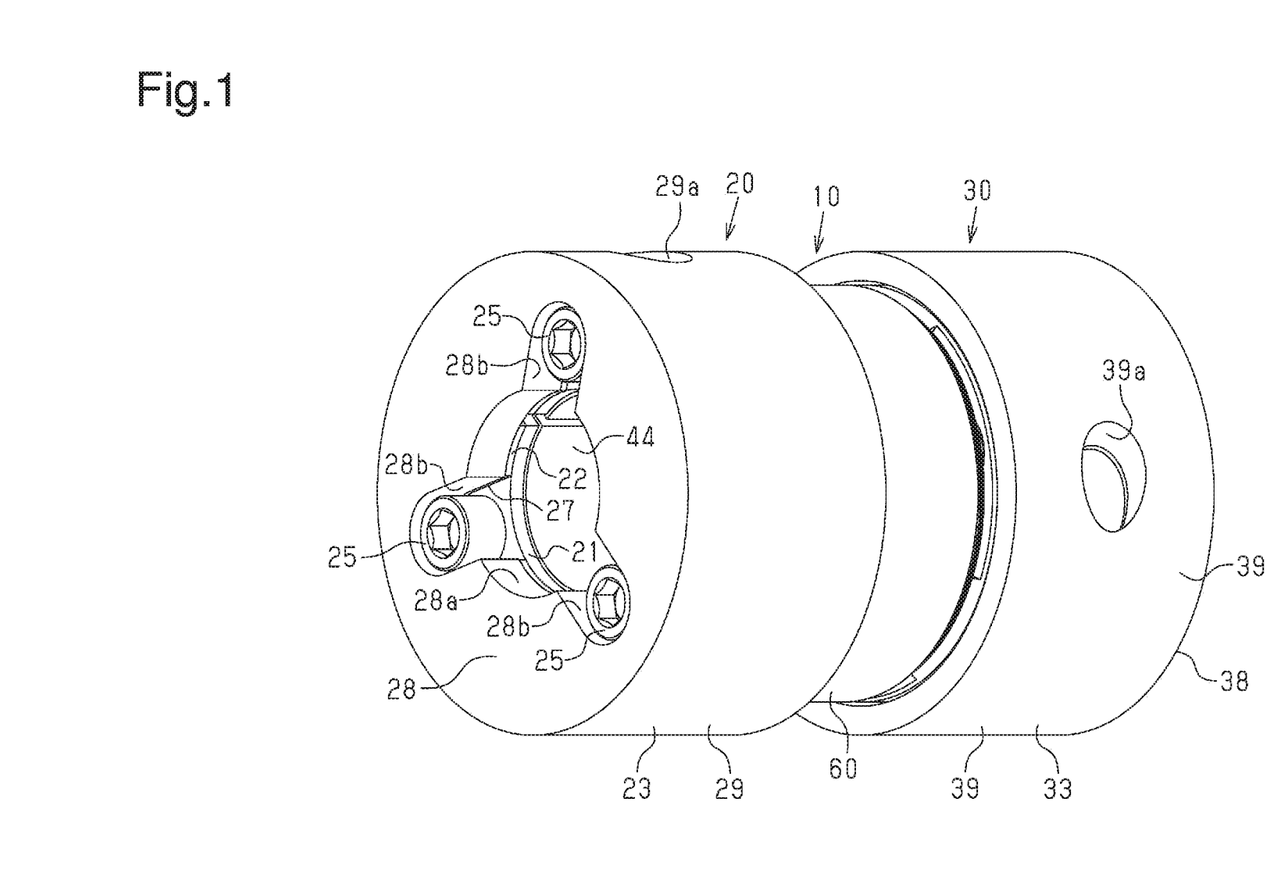
FIG. 1 is a perspective view of a shaft coupling with a dynamic vibration absorber according to a first embodiment.
Figure 2:
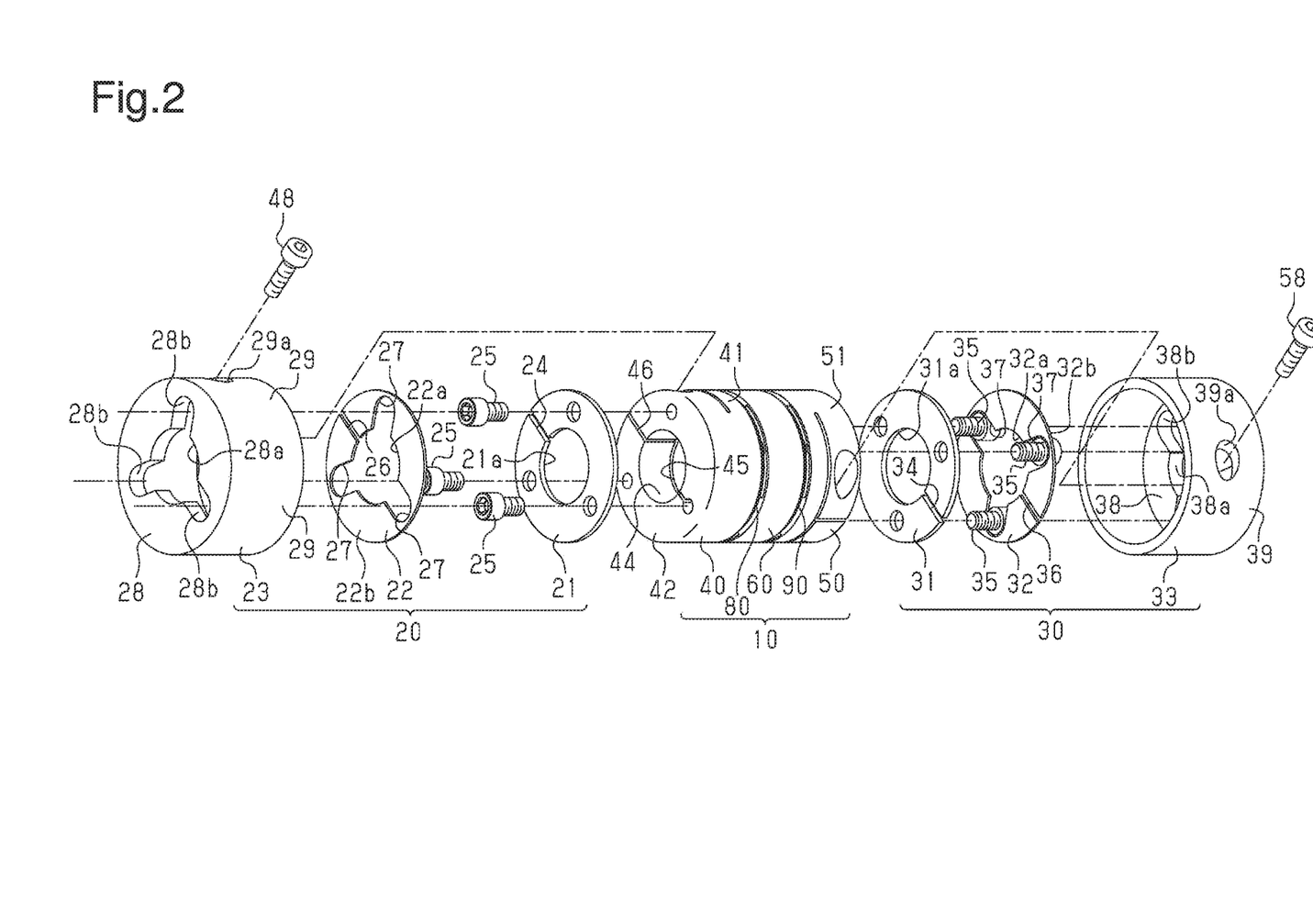
FIG. 2 is an exploded perspective view of the shaft coupling with the dynamic vibration absorber according to the first embodiment.

As shown in FIGS. 1 and 2, a shaft coupling 10 includes a pair of dynamic vibration absorbers 20 and 30.

Figure 3:
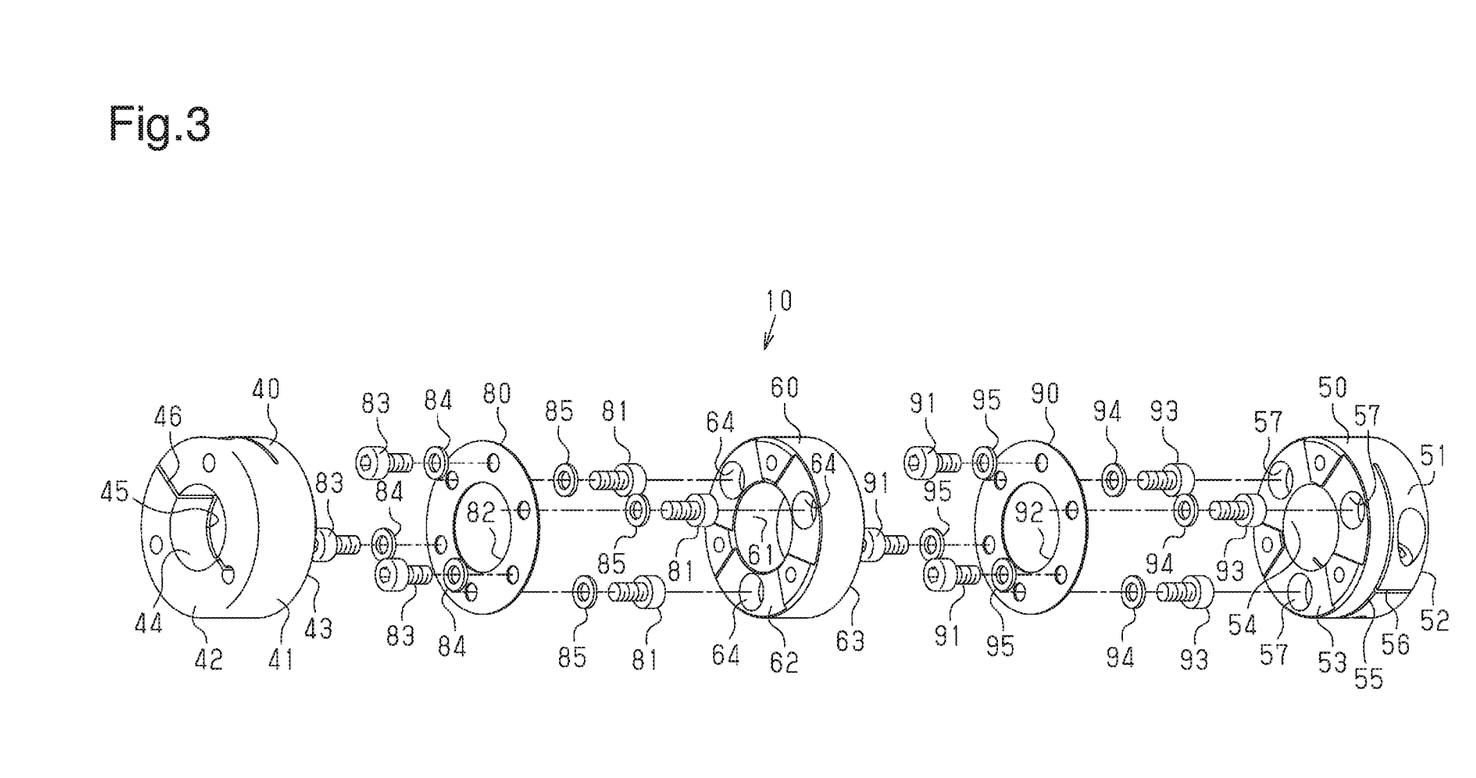
FIG. 3 is an exploded perspective view of the shaft coupling according to the first embodiment.
Figure 4:
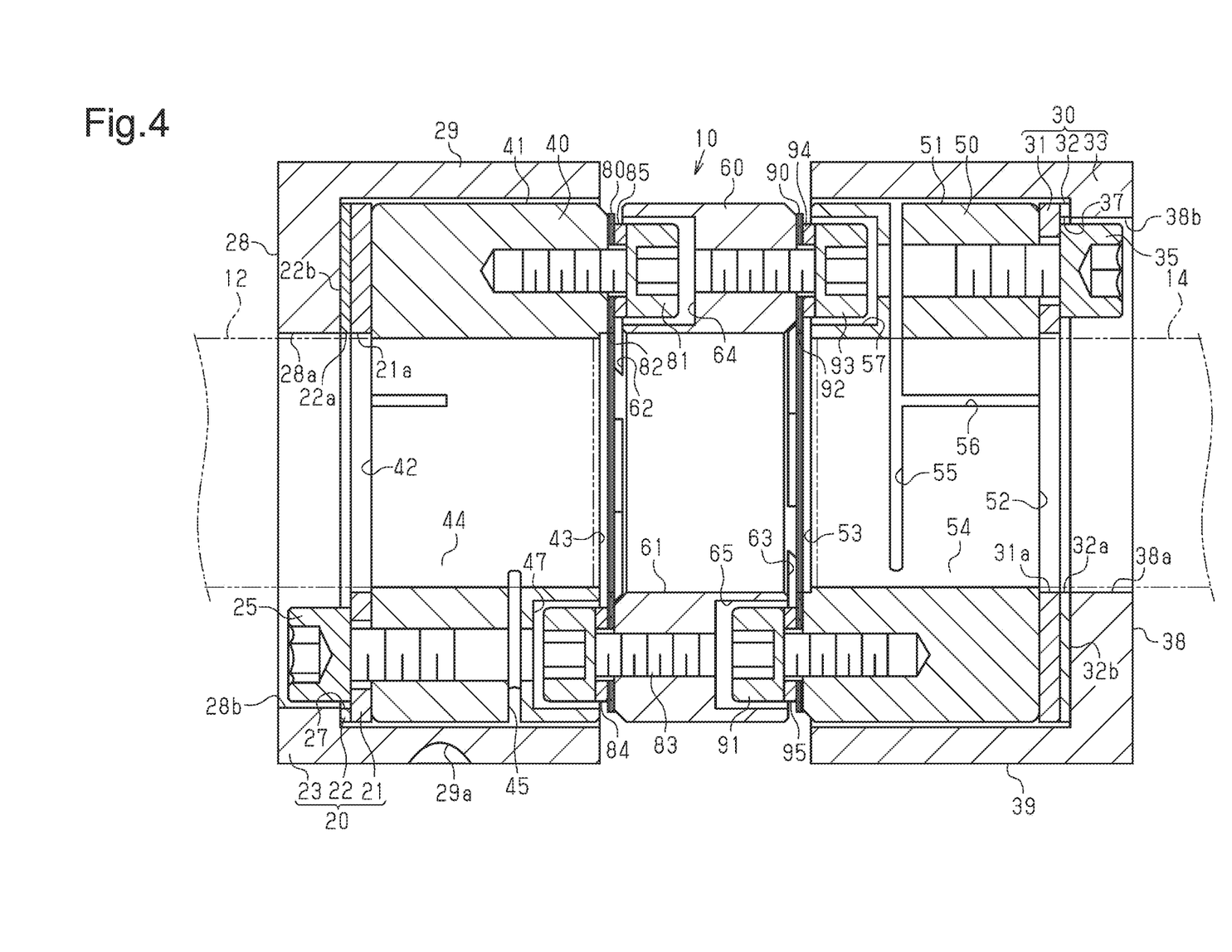
FIG. 4 is a cross-sectional view of the shaft coupling with the dynamic vibration absorber according to the first embodiment.

As shown in FIGS. 2, 3, and 4, the shaft coupling 10 includes a drive hub 40, which is connected to a drive shaft 12, a driven hub 50, which is connected to a driven shaft 14, a transmission member 60, which is arranged between the drive hub 40 and the driven hub 50, and a pair of disk units 80 and 90. The disk unit 80 is arranged between the drive hub 40 and the transmission member 60. The disk unit 90 is arranged between the driven hub 50 and the transmission member 60. The shaft coupling 10 of the present embodiment is a double-disk flexible coupling including the disk units 80 and 90.

As shown in FIGS. 3 and 4, the drive hub 40 is formed of, for example, aluminum or stainless-steel into a columnar shape. The drive hub 40 includes an outer circumferential surface 41, which has a circular cross-section, and an outer end face 42 and an inner end face 43, which are circular. A shaft hole 44, which has a circular cross-section, extends through the central portion of the outer end face 42 and the inner end face 43. As shown in FIG. 3, the drive hub 40 includes a slit 45, which is formed to extend from the outer circumferential surface 41 to the inner circumferential surface of the shaft hole 44, and a slit 46, which is formed to extend from the outer end face 42 to the slit 45.

As shown in FIG. 4, the drive shaft 12 is inserted in the shaft hole 44 from the outer end face 42. In this state, the shaft hole 44 is tightened by a coupling screw 48 (see FIG. 2) in a range permitted by the slit 46, so that the diameter of the shaft hole 44 is reduced. This couples the drive shaft 12 to the drive hub 40 to rotate integrally with the drive hub 40.

As shown in FIGS. 3 and 4, the driven hub 50 is formed of, for example, aluminum or stainless-steel into a columnar shape. The driven hub 50 includes an outer circumferential surface 51, which has a circular cross-section, and a circular outer end face 52 and a circular inner end face 53 in the axial direction. A shaft hole 54, which has a circular cross-section, extends through the central portion of the outer end face 52 and the inner end face 53. As shown in FIG. 3, the driven hub 50 includes a slit 55, which is formed to extend from the outer circumferential surface 51 to the inner circumferential surface of the shaft hole 54, and a slit 56, which is formed to extend from the outer end face 52 to the slit 55. As shown in FIG. 4, the driven shaft 14 is inserted in the shaft hole 54 from the outer end face 52. In this state, the shaft hole 54 is tightened by a coupling screw 58 (see FIG. 2) in a range permitted by the slit 56, so that the diameter of the shaft hole 54 is reduced. This couples the driven shaft 14 to the driven hub 50 to rotate integrally with the driven hub 50.

The disk unit 80 includes multiple metal leaf springs that are shaped like disks in the same sizes as one another and are placed one on the other. The leaf springs constituting the disk unit 80 each include a through-hole 82 having a circular cross-section at the center. As shown in FIG. 4, the disk unit 80 is securely fastened to the inner end face 43 of the drive hub 40 with transmission bolts 81, which are inserted from the side facing the transmission member 60. The transmission bolts 81 are arranged at equal angles about the center of rotation of the shaft coupling 10. As shown in FIG. 4, a spacer 85 is arranged between the head of each transmission bolt 81 and the disk unit 80 and is fastened by the transmission bolt 81.

The transmission member 60 is formed of aluminum or stainless-steel into a columnar shape and includes a through-hole 61, which extends between a pair of end faces 62 and 63.

As shown in FIG. 4, the disk unit 80 is securely fastened to the end face 62 of the transmission member 60 with transmission bolts 83, which are inserted from the side facing the drive hub 40, to be integrated with the transmission member 60. The transmission bolts 83 are arranged alternately between the transmission bolts 81 on a ring-shaped end face of the disk unit 80 and are spaced from the adjacent transmission bolts 81 at equal angles about the center of rotation of the shaft coupling 10.

Furthermore, the heads of the transmission bolts 81 are loosely fitted in recesses 64, which are formed in the end face 62 of the transmission member 60. The heads of the transmission bolts 83 are loosely fitted in recesses 47 of the drive hub 40.

The disk unit 90 includes multiple metal leaf springs that are shaped like disks in the same sizes as one another and as the metal leaf springs of the disk unit 80 and are placed one on the other. The leaf springs constituting the disk unit 90 each include a through-hole 92 having a circular cross-section at the center. As shown in FIG. 4, the disk unit 90 is securely fastened to the inner end face 53 of the driven hub 50 with transmission bolts 91, which are inserted from the side facing the transmission member 60.

The transmission bolts 91 are arranged at equal angles about the center of rotation of the shaft coupling 10. As shown in FIG. 4, a spacer 95 is arranged between the head of each transmission bolt 91 and the disk unit 90 and is fastened by the transmission bolt 91.

As shown in FIG. 4, the disk unit 90 is securely fastened to the end face 63 of the transmission member 60 with transmission bolts 93, which are inserted from the side facing the driven hub 50, to be integrated with the transmission member 60. As shown in FIG. 4, a spacer 94 is arranged between the head of each transmission bolt 93 and the disk unit 90 and is fastened by the transmission bolt 93.

The transmission bolts 93 are arranged alternately between the transmission bolts 91 on a ring-shaped end face of the disk unit 90 and are spaced from the adjacent transmission bolts 91 at equal angles about the center of rotation of the shaft coupling 10.

Furthermore, the heads of the transmission bolts 91 are loosely fitted in recesses 65, which are formed in the end face 63 of the transmission member 60. The heads of the transmission bolts 93 are loosely fitted in recesses 57, which are formed in the inner end face 53 of the driven hub 50.

The disk unit 80, the transmission bolts 81 and 83, the transmission member 60, the disk unit 90, and the transmission bolts 91 and 93 constitute a rotation transmission portion.

During use as shown in FIG. 4, when the drive shaft 12 is rotated by a non-illustrated motor, the rotation is transmitted to the transmission bolts 81 through the drive hub 40 in the shaft coupling 10. The rotation is transmitted from the transmission bolts 81 to the transmission bolts 83 through the disk unit 80 and is transmitted to the transmission member 60. The rotation transmitted to the transmission member 60 is transmitted to the disk unit 90 through the transmission bolts 93 and is transmitted to the driven hub 50 through the transmission bolts 91. The rotation transmitted to the driven hub 50 is transmitted to the driven shaft 14. During transmission of torque from the drive shaft 12 to the driven shaft 14, the rotation is smoothly transmitted even if the shaft coupling 10 is deformed by the elastic force of the disk units 80 and 90, and the central axis of the drive shaft 12 is not aligned with the central axis of the driven shaft 14.

As shown in FIG. 4, the dynamic vibration absorber 20 is mounted on the drive hub 40. As shown in FIG. 2, the dynamic vibration absorber 20 includes a mount 21, a vibration damper 22, and an inertial body 23. The parameters, such as the mass, of the dynamic vibration absorber 20 are set in accordance with, for example, the fixed-points theory or the optimal tuning method to inhibit vibration of the section of the shaft coupling 10 on which the drive hub 40 is located.

The mount 21 is formed of metal such as aluminum into a circular ring shape and has a certain thickness to give rigidity. The mount 21 corresponds to a mounting member. The mount 21 is secured to the outer end face 42 of the drive hub 40 with mounting bolts 25 arranged at an equal pitch. The outer end face 42 corresponds to an uninvolved section that is not involved in the torsional stiffness of the whole shaft coupling. The mount 21 includes a circular insertion hole 21a at the central portion. The insertion hole 21a has an inner diameter that is greater than the diameter of the drive shaft 12, so that the insertion hole 21a does not interfere with the inserted drive shaft 12. The mount 21 includes a slit 24, which extends from the insertion hole 21a in a radial direction, so that part of the section formed in the circumferential direction is cut.

The vibration damper 22 is formed of elastic material such as synthetic rubber or elastomer into a circular ring shape and has a certain thickness. The vibration damper 22 corresponds to an elastic member. The vibration damper 22 is secured to the mount 21 with an adhesive. The vibration damper 22 includes a circular insertion hole 22a at the central portion. The insertion hole 22a has the same diameter as the insertion hole 21a and is coaxial with the insertion hole 21a. The inner diameter of the insertion hole 22a is greater than the diameter of the drive shaft 12, so that the drive shaft 12 is received without interference.

Recesses 27 are formed in the inner circumferential surface of the insertion hole 22a of the vibration damper 22 so that the inner circumferential surface does not contact the heads of the mounting bolts 25. The vibration damper 22 includes a slit 26, which extends in the radial direction, so that part of the section formed in the circumferential direction is cut.

As shown in FIGS. 2 and 4, the inertial body 23 is formed of metal such as stainless-steel or iron and includes a disk-shaped plate portion 28 and a cylindrical barrel 29, which is integrally coupled to the periphery of the plate portion 28. The inner surface of the plate portion 28 is secured to a mounting surface 22b of the vibration damper 22 with an adhesive. The plate portion 28 corresponds to a supported portion. The plate portion 28 includes a circular insertion hole 28a at the central portion. The insertion hole 28a has the same diameter as the insertion hole 21a and is arranged to be coaxial with the insertion hole 21a. The inner diameter of the insertion hole 28a is greater than the diameter of the drive shaft 12, so that the drive shaft 12 is received without interference. Recesses 28b are formed in the inner circumferential surface of the insertion hole 28a so that the inner circumferential surface does not contact the heads of the mounting bolts 25.

As shown in FIG. 4, the barrel 29 is arranged to be coaxial with the drive hub 40 and to cover the entire outer circumferential surface of the drive hub 40. The barrel 29 corresponds to a cover. The barrel 29 includes a through-hole 29a, which extends through between the inner circumferential surface and the outer circumferential surface, so that the coupling screw 48 can be inserted.

As shown in FIG. 4, the dynamic vibration absorber 30 is mounted on the driven hub 50. As shown in FIG. 2, the dynamic vibration absorber 30 includes a mount 31, a vibration damper 32, and an inertial body 33. The parameters, such as the mass, of the dynamic vibration absorber 30 are set in accordance with, for example, the fixed-points theory or the optimal tuning method to inhibit vibration of the section of the shaft coupling 10 on which the driven hub 50 is located.

In the present embodiment, various components on the drive hub side including the drive hub 40 are identical to various components on the driven hub side including the driven hub 50. Thus, the sizes and the weights of the mount 31, the vibration damper 32, and the inertial body 33 of the dynamic vibration absorber 30 are the same as the sizes and the weights of the mount 21, the vibration damper 22, and the inertial body 23 of the dynamic vibration absorber 20.

The mount 31 is formed of metal such as aluminum into a circular ring shape and has a certain thickness to give rigidity. The mount 31 corresponds to a mounting member. The mount 31 is secured to the outer end face 52 of the driven hub 50 with mounting bolts 35 located on the outer end face 52 of the driven hub 50 at an equal pitch. The outer end face 52 corresponds to an uninvolved section that is not involved in the torsional stiffness of the whole shaft coupling. The mount 31 includes a circular insertion hole 31a at the central portion. The insertion hole 31a has an inner diameter that is greater than the diameter of the driven shaft 14, so that the insertion hole 31a does not interfere with the inserted driven shaft 14. The mount 31 includes a slit 34, which extends from the insertion hole 31a in a radial direction, so that part of the section formed in the circumferential direction is cut.

The vibration damper 32 is formed of elastic material such as synthetic rubber or elastomer into a circular ring shape and has a certain thickness. The vibration damper 32 corresponds to an elastic member. The vibration damper 32 is secured to the mount 31 with an adhesive. The vibration damper 32 includes a circular insertion hole 32a at the central portion. The insertion hole 32a has the same diameter as the insertion hole 31a and is arranged to be coaxial with the insertion hole 31a. The inner diameter of the insertion hole 32a is greater than the diameter of the driven shaft 14, so that the driven shaft 14 is received without interference. Recesses 37 are formed in the inner circumferential surface of the insertion hole 32a of the vibration damper 32 so that the inner circumferential surface does not contact the heads of the mounting bolts 35. The vibration damper 32 includes a slit 36, which extends in the radial direction, so that part of the section formed in the circumferential direction is cut.

As shown in FIGS. 2 and 4, the inertial body 33 is formed of metal such as stainless-steel or iron and includes a disk-shaped plate portion 38 and a cylindrical barrel 39, which is integrally coupled to the periphery of the plate portion 38. The inner surface of the plate portion 38 is secured to a mounting surface 32b of the vibration damper 32 with an adhesive. The plate portion 38 corresponds to a supported portion. The plate portion 38 includes an insertion hole 38a at the central portion. The insertion hole 38a has the same diameter as the insertion hole 31a and is arranged to be coaxial with the insertion hole 31a. The inner diameter of the insertion hole 38a is greater than the diameter of the driven shaft 14, so that the driven shaft 14 is received without interference. Recesses 38b are formed in the inner circumferential surface of the insertion hole 38a so that the inner circumferential surface does not contact the heads of the mounting bolts 35.

As shown in FIG. 4, the barrel 39 is arranged to be coaxial with the driven hub 50 and to cover the entire outer circumferential surface of the driven hub 50. The barrel 39 includes a through-hole 39a, which extends through between the inner circumferential surface and the outer circumferential surface, so that the coupling screw 58 can be inserted.

The operations of the shaft coupling 10 with the dynamic vibration absorber configured as above will be described.

When the drive shaft 12 is rotated by a non-illustrated motor, the rotation is transmitted to the driven shaft 14 through the drive hub 40, the disk unit 80, the transmission member 60, the driven hub 50, and the like. The dynamic vibration absorber 20, which is coupled to the drive hub 40, absorbs the vibration of the drive hub 40 by applying reaction force proportional to the vibration and the amplitude of the drive hub 40 with the inertial body 23. The vibration damper 22 of the dynamic vibration absorber 20 damps the vibration of the drive hub 40 with its damping capability.

The dynamic vibration absorber 30, which is coupled to the driven hub 50, absorbs the vibration of the driven hub 50 by applying reaction force proportional to the vibration and the amplitude of the driven hub 50 with the inertial body 33. The vibration damper 32 of the dynamic vibration absorber 30 damps the vibration of the driven hub 50 with its damping capability.

In the present embodiment, the dynamic vibration absorbers 20 and 30 are mounted on the drive hub 40 and the driven hub 50 of the shaft coupling 10, respectively. Thus, the shaft coupling 10 of the present embodiment has improved response to changes in the driving side, for example, improved response to motor commands as compared with a case in which only one dynamic vibration absorber is mounted on one of the drive hub 40 and the driven hub 50 of the shaft coupling 10 under the same moment of inertia of load, that is, the same moment of inertia ratio. Furthermore, the shaft coupling 10 has improved robustness, so that the shaft coupling 10 bears changes in the parameters related to a torque transmission system.

In the present embodiment, the barrels 29 and 39 of the inertial bodies 23 and 33 of the dynamic vibration absorbers 20 and 30 are arranged to cover the drive hub 40 and the driven hub 50, respectively. Thus, as compared with a case in which the entire inertial bodies 23 and 33 are shaped like a disk, the dynamic vibration absorbers 20 and 30 have a reduced dimension in the radial direction and are reduced in size.

The present embodiment has the following advantages.

(1) In the shaft coupling 10, the dynamic vibration absorbers 20 and 30 are coupled to and integrated with the outer end faces 42 and 52, respectively, which are the sections of the drive hub 40 and the driven hub 50, that is, the uninvolved sections, which are not involved in the torsional stiffness of the whole shaft coupling 10. As a result, the dynamic vibration absorbers are mounted on the uninvolved sections, which are not involved in the torsional stiffness of the whole shaft coupling, so that the vibration absorption performance is enhanced while maintaining the torsional stiffness.

(2) The dynamic vibration absorbers 20 and 30 include the inertial bodies 23 and 33, the mounts 21 and 31, and the vibration dampers 22 and 32, respectively. The mount 21 is the mounting member, which mounts the inertial body 23 on the uninvolved section of the drive hub 40. The mount 31 is the mounting member, which mounts the inertial body 33 on the uninvolved section of the driven hub 50. The vibration damper 22 is the elastic member, which is arranged between the inertial body 23 and the mount 21 to support the inertial body 23. The vibration damper 32 is the elastic member, which is arranged between the inertial body 33 and the mount 31 to support the inertial body 33. The inertial body 23, the mount 21, and the vibration damper 22 are arranged in a non-contact manner with respect to the drive shaft 12. The inertial body 33, the mount 31, and the vibration damper 32 are arranged in a non-contact manner with respect to the driven shaft 14. With this configuration, the damping performance and the vibration absorption performance of the dynamic vibration absorbers are more reliably exerted.

(3) The drive hub 40 and the driven hub 50 of the shaft coupling 10 are columnar. The drive hub 40 includes the shaft hole 44, in which the drive shaft 12 is fitted, and the outer end face 42 and the inner end face 43 in the axial direction. The driven hub 50 includes the shaft hole 54, in which the driven shaft 14 is fitted, and the outer end face 52 and the inner end face 53 in the axial direction. The outer end faces 42 and 52 are the uninvolved sections on which the mounting members are mounted. As a result, since the dynamic vibration absorbers 20 and 30 are mounted on the outer end faces 42 and 52 of the columnar drive hub 40 and the columnar driven hub 50, the vibration absorption performance is enhanced while maintaining the torsional stiffness.

(4) The inertial body 23 includes the barrel 29, which covers the outer circumferential surface of the drive hub 40, on which the mount 21 is mounted, and the plate portion 28, which is the section supported by the elastic member, which is the vibration damper 22, and is integrally coupled to the barrel 29. The inertial body 33 includes the barrel 39, which covers the outer circumferential surface of the driven hub 50, on which the mount 31 is mounted, and the plate portion 38, which is the section supported by the elastic member, which is the vibration damper 32, and is integrally coupled to the barrel 39. As a result, if the vibration absorption performance of the inertial bodies 23 and 33, which are arranged to cover the outer circumferential surfaces of the drive hub 40 and the driven hub 50, is set to be the same as that of a disk-shaped inertial body, the outer diameter from the rotational axis is reduced as compared with the disk-shaped inertial body, and the outer shapes of the inertial bodies 23, 33 are reduced in size.

(5) The mounting member, which is the mount 21, and the elastic member, which is the vibration damper 22, are shaped like a circular ring and include the insertion holes 21a and 22a, respectively, in which the drive shaft 12 is inserted in a non-contact manner. The mounting member, which is the mount 31, and the elastic member, which is the vibration damper 32, are shaped like a circular ring and include the insertion holes 31a and 32a, respectively, in which the driven shaft 14 is inserted in a non-contact manner. The vibration damper 22 is overlapped with the section of the inertial body 23 supported by the vibration damper 22 and the mount 21. The vibration damper 32 is overlapped with the section of the inertial body 33 supported by the vibration damper 32 and the mount 31.

As a result, the vibration damper 22 shaped like a circular ring is overlapped with the mount 21, which is also shaped like a circular ring, and the inertial body 23, and the drive shaft 12 is inserted in the insertion holes 21a and 22a in a non-contact manner. The vibration damper 32 shaped like a circular ring is overlapped with the mount 31, which is also shaped like a circular ring, and the inertial body 33, and the driven shaft 14 is inserted in the insertion holes 31a and 32a in a non-contact manner. Consequently, the damping performance and the vibration absorption performance of the dynamic vibration absorbers are exerted with a simple structure.

(6) The dynamic vibration absorbers 20 and 30 of the present embodiment are mounted on the drive hub 40 and the driven hub 50, respectively. As a result, the vibration of the drive hub 40 and the vibration of the driven hub 50 are independently absorbed by the dynamic vibration absorbers 20 and 30.

Next, the shaft couplings according to other embodiments shown in FIGS. 5 to 10 will be described. The shaft couplings of other embodiments have the same structure as the shaft coupling 10 of the first embodiment except that dynamic vibration absorbers 120, 220, and 320 are mounted on only the drive hub 40, and the structures of the dynamic vibration absorbers 120, 220, and 320 greatly differ from that of the first embodiment. The structures different from the first embodiment will further be described below.

Second Embodiment

Figure 5:
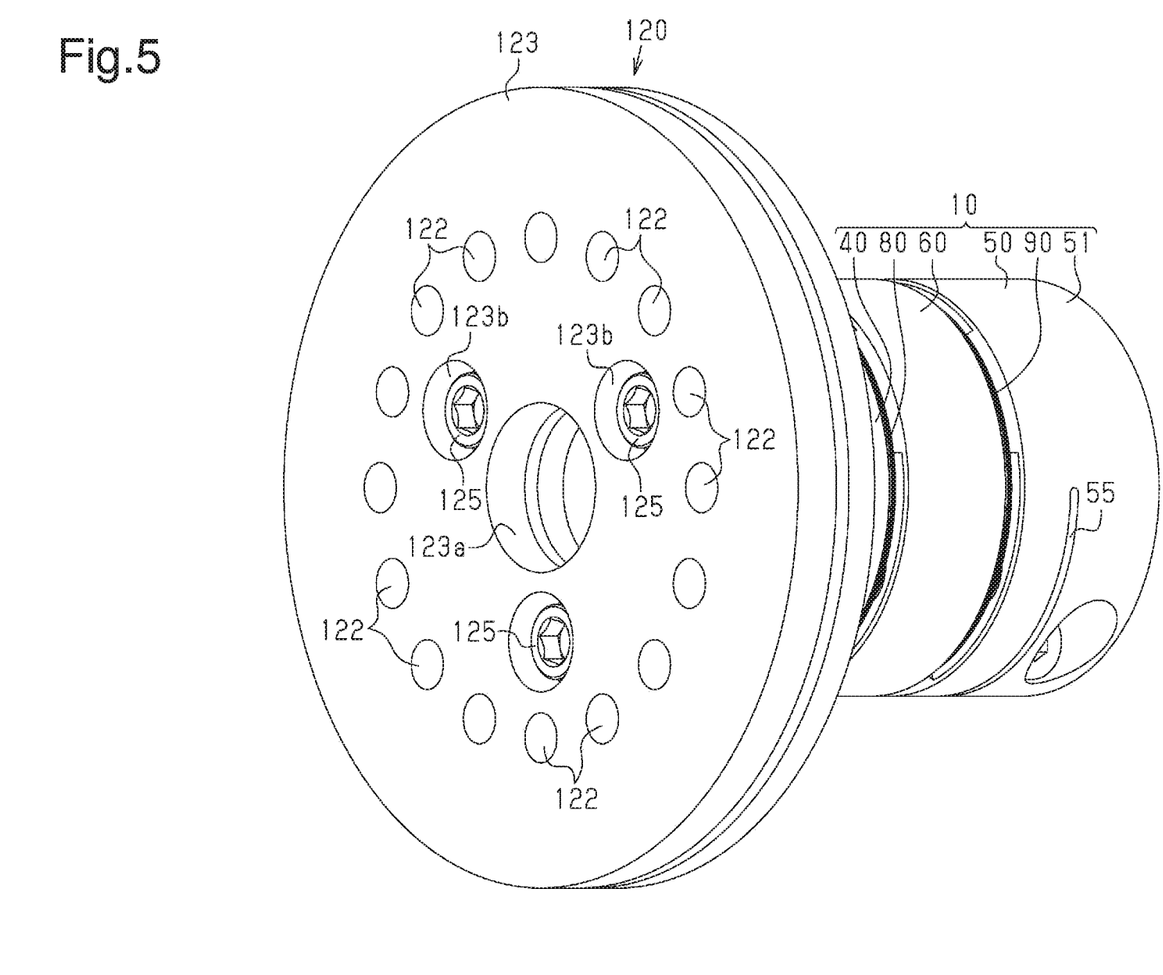
FIG. 5 is a perspective view of a shaft coupling with a dynamic vibration absorber according to a second embodiment.
Figure 6:
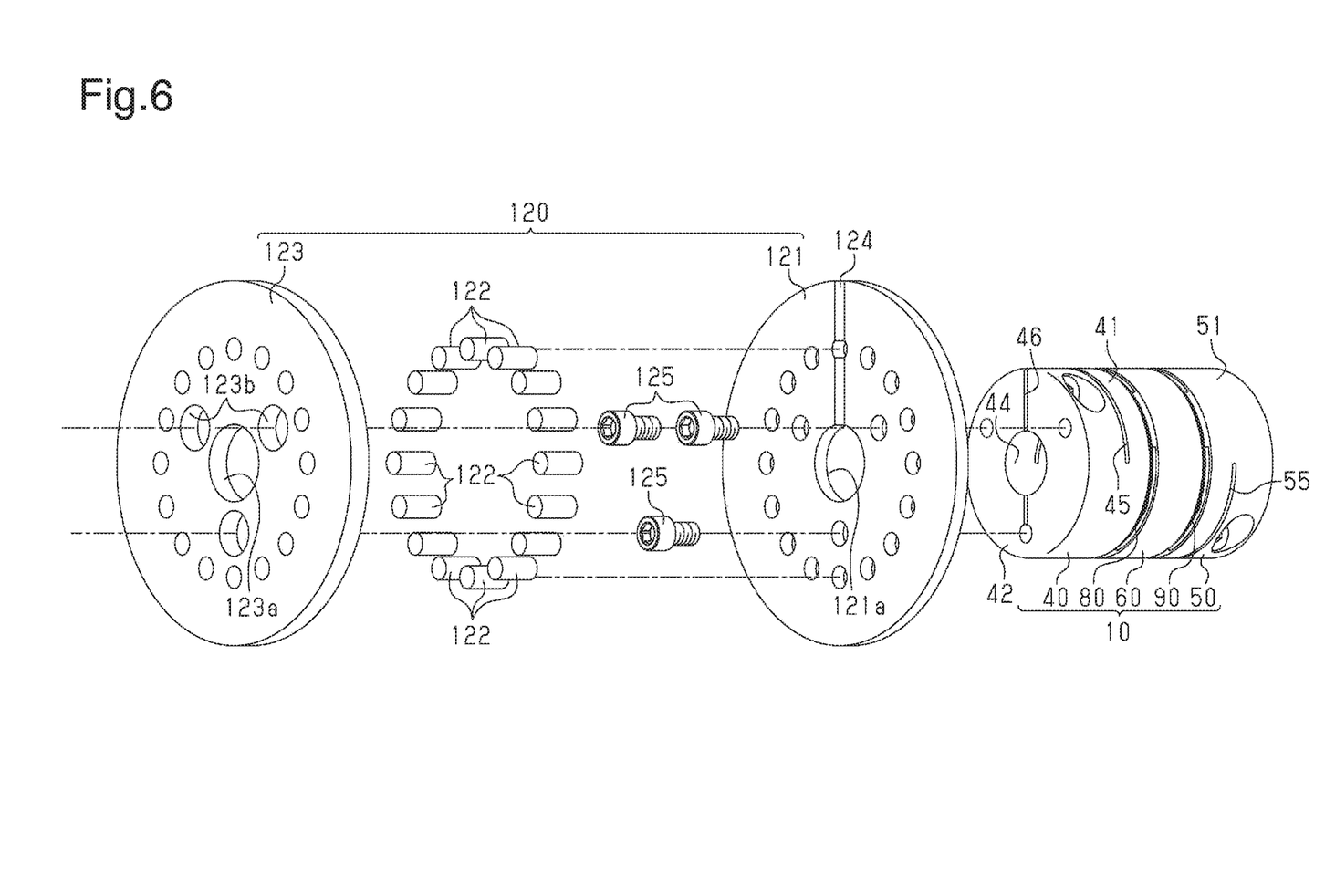
FIG. 6 is an exploded perspective view of the dynamic vibration absorber according to the second embodiment.

The dynamic vibration absorber 120 of the second embodiment shown in FIGS. 5 and 6 includes a mount 121, vibration dampers 122, and an inertial body 123. The mount 121 is formed of metal such as aluminum, has the outer diameter greater than the outer diameter of the drive hub 40, is shaped like a circular ring, and has a certain thickness to give rigidity. The mount 121 corresponds to a mounting member. The mount 121 is secured to the outer end face 42 of the drive hub 40 with mounting bolts 125 arranged at an equal pitch to be coaxial with the drive hub 40. The mount 121 includes a circular insertion hole 121a at the central portion. The insertion hole 121a has an inner diameter that is greater than the diameter of the drive shaft 12, so that the insertion hole 121a does not interfere with the inserted drive shaft 12. The mount 121 includes a slit 124, which extends from the insertion hole 121a in a radial direction, so that part of the section formed in the circumferential direction is cut.

The vibration dampers 122 are formed of elastic material such as synthetic rubber or elastomer and are shaped like pins. The vibration dampers 122 correspond to elastic members. The inner ends of the vibration dampers 122 are secured to the mount 121 with an adhesive to be arranged at an equal pitch about the insertion hole 121a. The vibration dampers 122 are separated from the insertion hole 121a in a radial direction, so that the vibration dampers 122 are arranged about the drive shaft 12 not to interfere with the drive shaft 12.

As shown in FIGS. 5 and 6, the inertial body 123 is formed of metal such as stainless-steel or iron and is shaped like a disk having an outer diameter that is the same as the diameter of the mount 121. That is, the inertial body 123 bulges in a radial direction from the outer shape of the drive hub 40. The inner surface of the inertial body 123 is secured to the outer ends of the vibration dampers 122 with an adhesive, so that the inertial body 123 is arranged to be parallel to and spaced apart from the mount 121. In this manner, the axial ends of the vibration dampers 122 are secured to the inertial body 123 and the mount 121. The inner surface of the inertial body 123 corresponds to a supported portion.

The inertial body 123 includes an insertion hole 123a at the central portion. The insertion hole 123a has the same diameter as the insertion hole 121a and is coaxial with the insertion hole 121a. The insertion hole 123a of the inertial body 123 has an inner diameter that is greater than the outer diameter of the drive shaft 12, so that the drive shaft 12 is received without interference. Furthermore, the inertial body 123 includes through-holes 123b. The through-holes 123b have a diameter greater than the diameter of the heads of the mounting bolts 125 so as not to contact the heads of the mounting bolts 125, which secure the mount 121 to the drive hub 40.

In the shaft coupling 10 configured as described above, the dynamic vibration absorber 120 is mounted on only the drive hub 40.

The present embodiment has the following advantages.

(7) The inertial body 123 of the present embodiment bulges in a radial direction from the outer shape of the drive hub 40 and is shaped like a disk. As a result, according to the present embodiment, the vibration absorption performance is improved while maintaining the torsional stiffness with a simple structure.

(8) The dynamic vibration absorber 120 of the present embodiment includes the vibration dampers 122, which are shaped like pins. Furthermore, the vibration dampers 122 are arranged about the drive shaft, and the axial ends of the vibration dampers 122 are secured to the inertial body 123 and the mount 121. As a result, since the ends of the vibration dampers 122 arranged about the drive shaft are secured to the inertial body and the mounting member, the inertial body 123 is supported.

Third Embodiment

Figure 7:
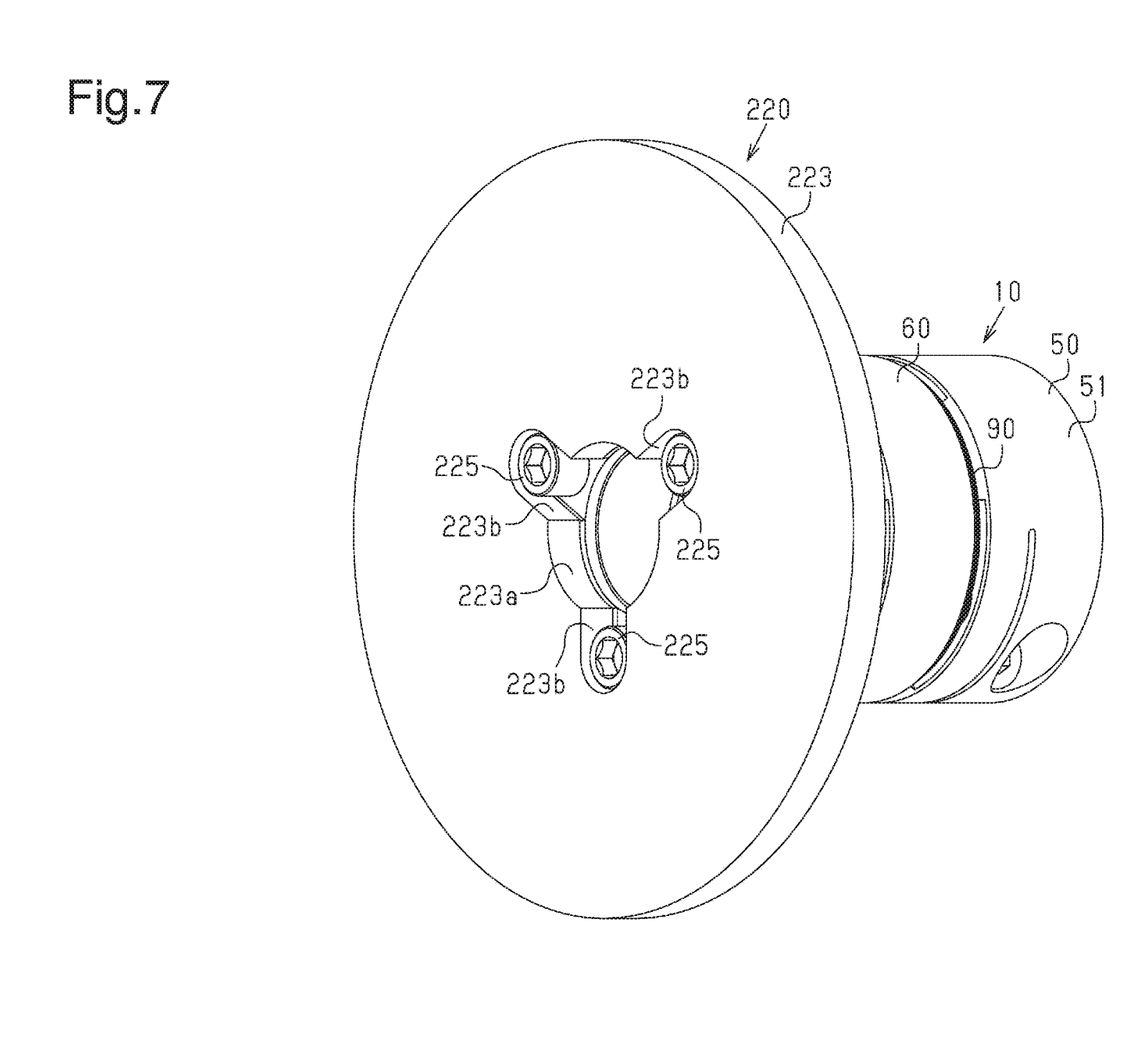
FIG. 7 is a perspective view of a shaft coupling with a dynamic vibration absorber according to a third embodiment.
Figure 8:
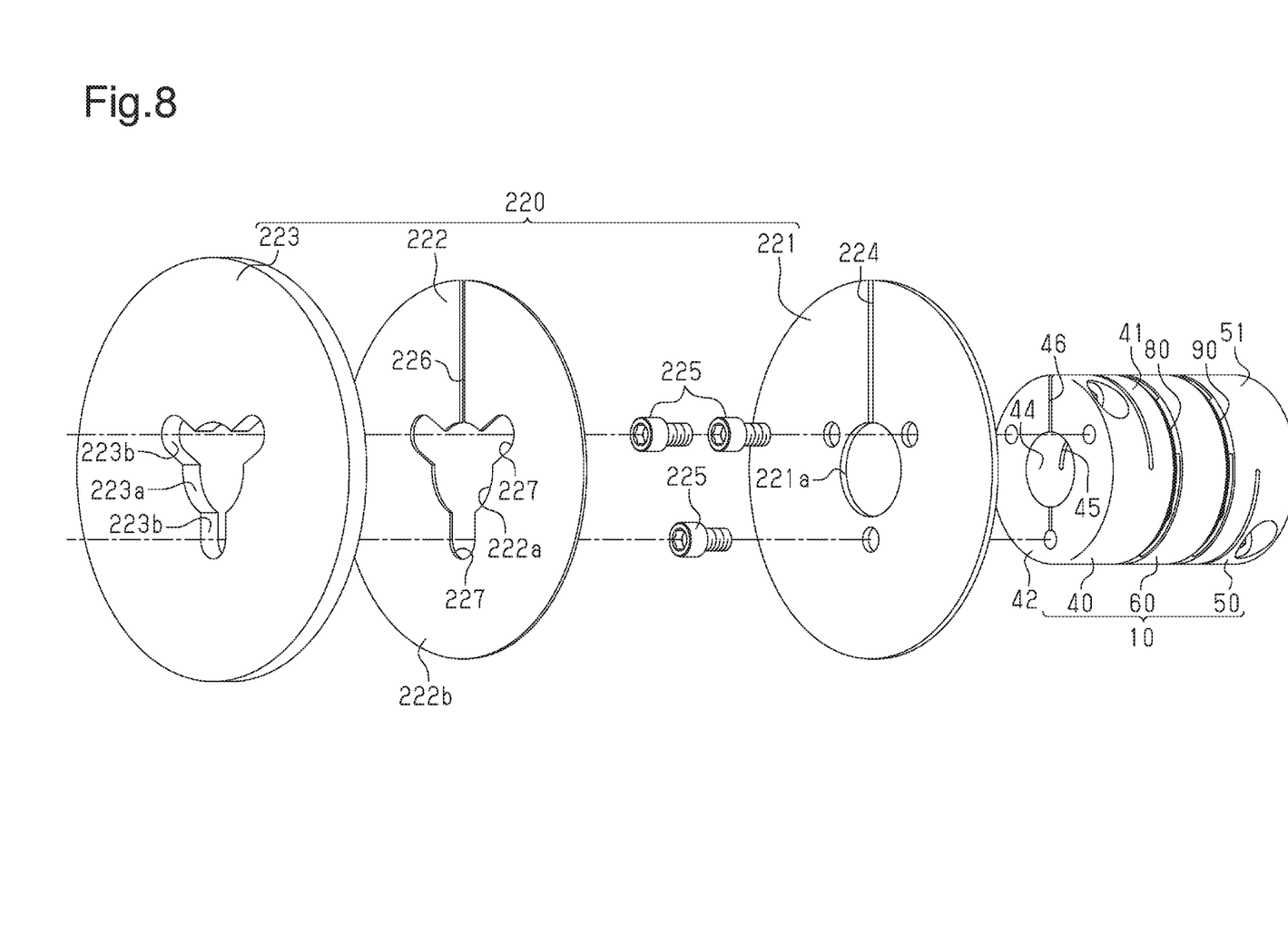
FIG. 8 is an exploded perspective view of the dynamic vibration absorber according to the third embodiment.

The dynamic vibration absorber 220 according to a third embodiment shown in FIGS. 7 and 8 includes a mount 221, a vibration damper 222, and an inertial body 223. The mount 221 and the vibration damper 222 have the same structures as the mount 21 and the vibration damper 22 of the first embodiment and are mounted on the outer end face 42 of the drive hub 40 in the same manner as in the first embodiment.

Thus, the reference numbers of parts of the mount 221 and the vibration damper 222 and mounting bolts 225 have the same lower two digits as the reference numbers of the corresponding parts of the mount 21, the vibration damper 22, and the mounting bolts 25, and the descriptions are omitted.

As shown in FIGS. 7 and 8, the inertial body 223 is formed of metal such as stainless-steel or iron and shaped like a disk having an outer diameter that is greater than the outer diameter of the mount 221. That is, the inertial body 223 bulges in a radial direction from the outer shape of the drive hub 40. The inner surface of the inertial body 223 is secured to the outer end of each vibration damper 222 with an adhesive and is arranged to be parallel to and spaced apart from the mount 221. In this manner, the surfaces of the vibration damper 222 in the axial direction are secured to the inertial body 223 and the mount 221. The inner surface of the inertial body 223 corresponds to a supported portion.

The inertial body 223 includes an insertion hole 223a at the central portion. The insertion hole 223a has the same diameter as insertion holes 221a and 222a and is coaxial with the insertion hole 221a. The insertion hole 223a of the inertial body 223 has an inner diameter that is greater than the outer diameter of the drive shaft 12, so that the drive shaft 12 is received without interference. Furthermore, recesses 223b are formed in the insertion hole 223a. The recesses 223b have a diameter greater than the diameter of the heads of the mounting bolts 225 so as not to contact the heads of the mounting bolts 225, which secure the mount 221 to the drive hub 40.

Figure 9:
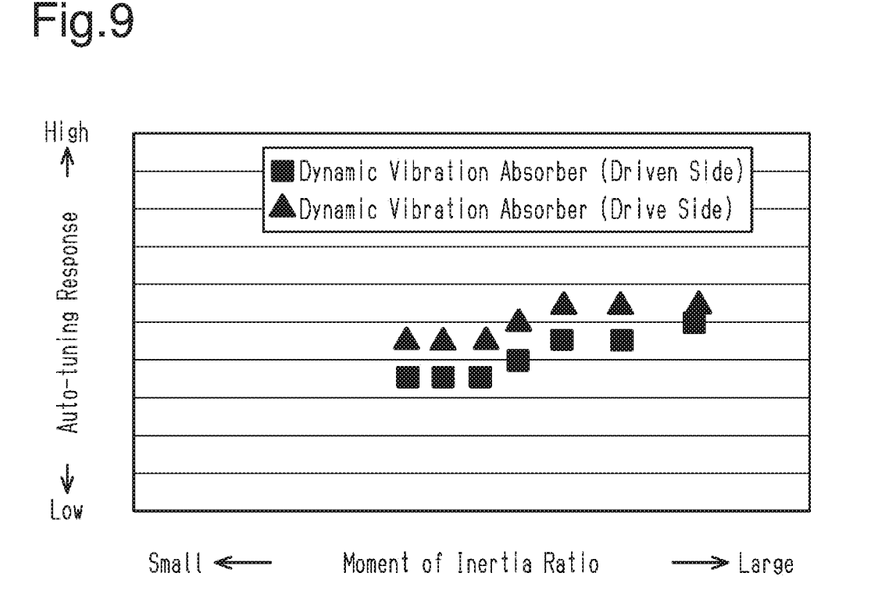
FIG. 9 is a graph showing test results according to the third embodiment.

FIG. 9 shows test results of the shaft coupling 10 in which the dynamic vibration absorber 220 was mounted on only the drive hub as described above and the shaft coupling 10 in which the dynamic vibration absorber 220 was mounted on only the driven hub when each shaft coupling 10 was mounted between the drive shaft driven by a drive motor and the driven shaft coupled to a load. In the graph of the test results in FIG. 9, the horizontal axis represents the moment of inertia ratio, and the vertical axis represents the response in an auto-tuning process. The graph indicates that the higher the point in the vertical axis, the higher the response becomes. The tests measured the responses in the auto-tuning process when the controller that controlled the drive shaft had an auto-tuning function and varied the moment of inertia ratio. The auto-tuning process refers to the function that, during operation, estimates the inertia and the friction of the overall driving section including the motor in accordance with the motor current and the motor rotational speed and automatically updates the gain of a servo system online based on a predetermined control law to improve the response, the robustness, and the stationary characteristics while maintaining the stability.

As shown in FIG. 9, every case the moment of inertia ratio was changed, the case in which the dynamic vibration absorber 220 was mounted on the drive hub 40 as in the present embodiment showed higher response in the auto-tuning process. It is assumed that the reason for the response to be enhanced when the dynamic vibration absorber 220 is mounted on the drive hub 40 is that when being mounted on the driving side, the dynamic vibration absorber 220 is closer to the motor, which is the source of the vibration, so that the vibration absorption performance of the dynamic vibration absorber 220 is easily exerted. The shaft coupling 10 configured as described above easily achieves the following advantages in addition to the advantage (7) of the second embodiment.

(9) In the present embodiment, the dynamic vibration absorber 220 is mounted on only the drive hub 40. As a result, if the controller for controlling the motor includes the auto-tuning function, the case in which the dynamic vibration absorber 220 is mounted on the drive hub 40 enhances the response in the auto-tuning process. In the second embodiment also, since the dynamic vibration absorber 120 is mounted on only the drive hub 40, the response of the auto-tuning process is expected to be enhanced as in the present embodiment.

Fourth Embodiment

Figure 10:
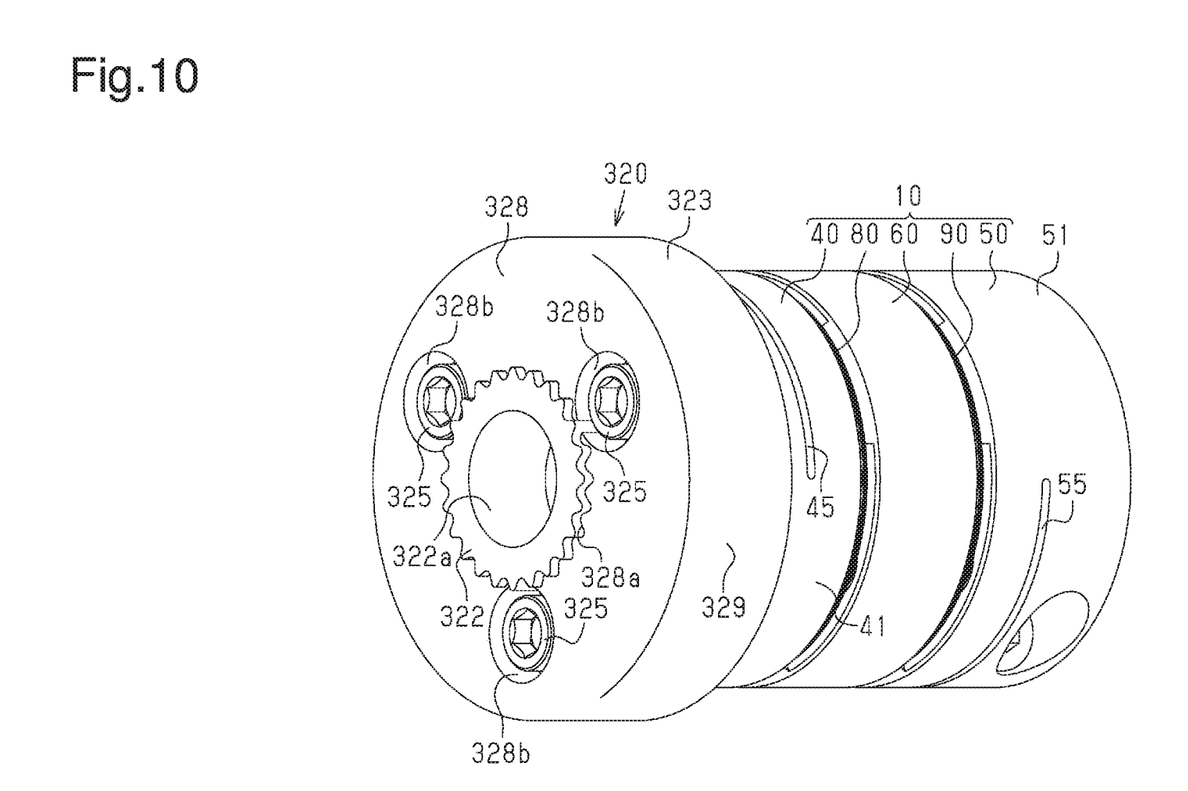
FIG. 10 is a perspective view of a shaft coupling with a dynamic vibration absorber according to a fourth embodiment.
Figure 11:
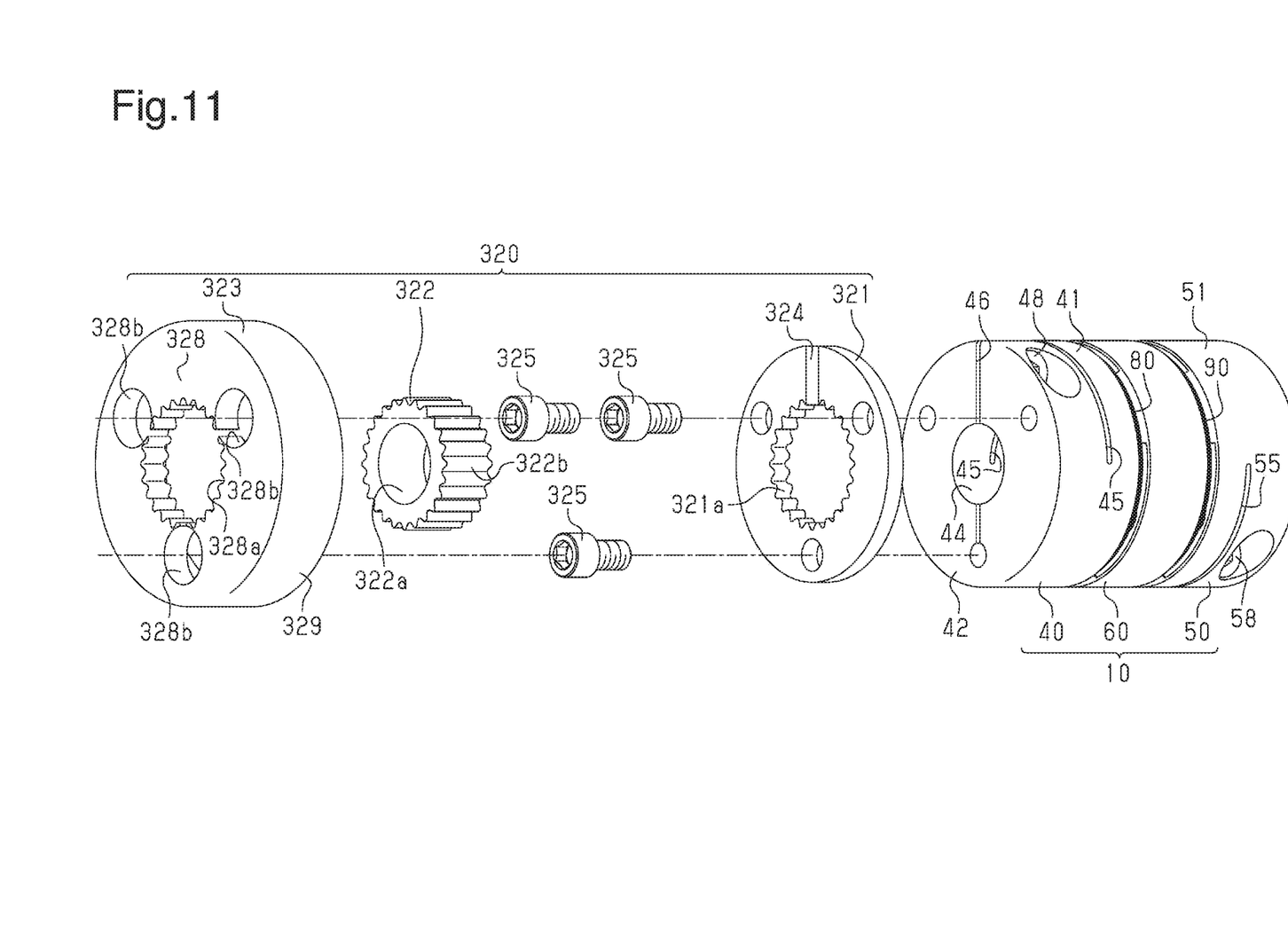
FIG. 11 is an exploded perspective view of the dynamic vibration absorber according to the fourth embodiment.

The dynamic vibration absorber 320 of the fourth embodiment shown in FIGS. 10 and 11 includes a mount 321, a vibration damper 322, and an inertial body 323.

The mount 321 shown in FIG. 11 is formed of metal such as aluminum, has the diameter substantially the same as the outer diameter of the drive hub 40, is shaped like a circular ring, and has a certain thickness to give rigidity. The mount 321 corresponds to a mounting member. The mount 321 is secured to the outer end face 42 of the drive hub 40 with mounting bolts 325 arranged at an equal pitch to be coaxial with the drive hub 40.

The mount 321 includes a fitting hole 321a at the central portion. The vibration damper 322 is shaped like a cylinder, and the inner end of the vibration damper 322 in the axial direction is fitted to the fitting hole 321a to be securely adhered to the fitting hole 321a. An outer circumferential surface 322b of the vibration damper 322 is shaped like a gear to be meshed with a gear-like section formed on the inner circumferential surface of the fitting hole 321a, so that the vibration damper 322 is prevented from being rotated about the shaft center. The mount 321 includes a slit 324, which extends from the fitting hole 321a in a radial direction, so that part of the section formed in the circumferential direction is cut.

The vibration damper 322 is formed of elastic material such as synthetic rubber or elastomer. The vibration damper 322 corresponds to an elastic member. The vibration damper 322 includes an insertion hole 322a, in which the drive shaft is inserted in a non-contact manner, at the central portion. That is, the inner diameter of the insertion hole 322a is greater than the outer diameter of the non-illustrated drive shaft to be mounted to the shaft hole 44 of the drive hub 40.

As shown in FIGS. 10 and 11, the inertial body 323 is formed of metal such as stainless-steel or iron and includes a disk-shaped plate portion 328 and a cylindrical barrel 329, which is coupled to the periphery of the plate portion 328. The plate portion 328 includes a fitting hole 328a at the central portion. The outer end of the vibration damper 322 in the axial direction is fitted to the fitting hole 328a to be securely adhered to the fitting hole 328a. The gear-like outer circumferential surface 322b of the vibration damper 322 is meshed with a gear-like section formed on the inner circumferential surface of the fitting hole 328a, so that the vibration damper 322 is prevented from being rotated about the shaft center. The plate portion 328 corresponds to a supported portion. The plate portion 328 and the mount 321 are spaced apart not to contact each other and are parallel to each other. The plate portion 328 includes accommodating holes 328b, which accommodate the heads of the mounting bolts 325 with spaces around the heads of the mounting bolts 325.

The barrel 329 is arranged to be coaxial with the drive hub 40 and to cover the outer circumferential surface of the drive hub 40. The barrel 329 corresponds to a cover. The barrel 329 includes a non-illustrated through-hole, which extends through between the inner circumferential surface and the outer circumferential surface. The coupling screw 48 described in the first embodiment is inserted in the through-hole.

The shaft coupling 10 having the above-described configuration has the following advantage in addition to the advantages (1) to (4) of the first embodiment.

(10) In the present embodiment, the vibration damper 322 is a single member and is shaped like a cylinder, so that the drive shaft can be inserted in a non-contact manner. Furthermore, the axial ends of the vibration damper 322 are securely fitted to the inertial body 323 and the mount 321. As a result, since the axial ends of the vibration damper 322 are securely fitted to the inertial body and the mounting member, the inertial body 323 is supported.

The above-described embodiments may be modified as follows.

In the above embodiments, the shaft coupling is a double-disk coupling, but may be a single-disk coupling. The shaft coupling is not limited to a disk coupling and may be replaced with other types of flexible coupling or a rigid coupling.

In the above embodiment, the outer end faces 42 and 52 of the hubs 40 and 50 are used as the uninvolved section on which the mounting member is mounted. Instead, the inner end faces 43 and 53 of the hubs 40 and 50 may be used as the uninvolved section on which the mounting member is mounted.

The outer circumferential surfaces of the drive hub 40 and the driven hub 50 may be used as the uninvolved section, and the dynamic vibration absorbers may be securely mounted on the outer circumferential surfaces.

In the second embodiment, the third embodiment, and the fourth embodiment, the dynamic vibration absorber 120, 220, or 320 is mounted on the drive hub 40. However, the dynamic vibration absorber may be mounted on only the driven hub 50.

In the fourth embodiment, the outer circumferential surface of the vibration damper 322 is shaped like a gear, but is not limited to this shape. For example, the outer circumferential surface of the vibration damper 322 may include a groove or a protrusion, and the inertial body and the mounting member fitted to the vibration damper 322 may include a protrusion or a groove to be fitted to the groove or the protrusion of the vibration damper 322.

The invention claimed is:

1. A shaft coupling comprising:
a drive hub that is coupled to a drive shaft to rotate integrally with the drive shaft;
a driven hub that is coupled to a driven shaft to rotate integrally with the driven shaft;
a rotation transmission portion that transmits rotation between the drive hub and the driven hub; and
a dynamic vibration absorber integrally coupled to at least one of the drive hub and the driven hub, wherein
the at least one of the drive hub and the driven hub is shaped like a column and includes a shaft hole in which the drive shaft or the driven shaft is fitted and a pair of end faces in the axial direction,
the dynamic vibration absorber is coupled to one of the end faces,
the dynamic vibration absorber includes
an inertial body,
a mounting member that is secured to the one of the end faces, and
at least one elastic member that is arranged between the inertial body and the mounting member,
the inertial body, the mounting member, and the elastic member are arranged in a non-contact manner with respect to the drive shaft and the driven shaft,
the inertial body includes
a cover that covers an outer circumferential surface of the hub on which the inertial body is mounted, and
a supported portion that is supported by the elastic member and is integrally coupled to the cover,
the elastic member includes a first face facing the mounting member in the axial direction and an opposite second face facing an inner surface of the supported portion in the axial direction,
the mounting member is secured to the first face of the elastic member, and
the inner surface of the supported portion is secured to the second face of the elastic member.

2. The shaft coupling according to claim 1, wherein
the elastic member is a single member,
the elastic member and the mounting member are shaped like a circular ring and each include an insertion hole in which the drive shaft or the driven shaft is inserted in a non-contact manner, and
the elastic member is overlapped with the supported portion of the inertial body and with the mounting member.

3. The shaft coupling according to claim 1, wherein the dynamic vibration absorber is mounted on only the drive hub.

4. The shaft coupling according to claim 1, wherein the dynamic vibration absorber is mounted on each of the drive hub and the driven hub.

* * * * *